United States Patent [19]

Nakai et al.

[11] Patent Number: 4,817,881
[45] Date of Patent: Apr. 4, 1989

[54] ENDLESS MICROCASSETTE TAPE

[75] Inventors: Hiromi Nakai; Masao Tsurumaki, both of Saitama, Japan

[73] Assignee: Asahi Corporation, Saitama, Japan

[21] Appl. No.: 67,145

[22] Filed: Jun. 29, 1987

[51] Int. Cl.[4] .............................................. G11B 23/07
[52] U.S. Cl. ............................. 242/55.19 A; 242/197; 360/93
[58] Field of Search ............... 242/55.19 A, 197, 199, 242/198, 76, 55.19 R; 360/132, 93

[56] References Cited

U.S. PATENT DOCUMENTS

| | | | |
|---|---|---|---|
| 3,563,482 | 2/1971 | Auld | 242/55.19 A |
| 3,675,867 | 7/1972 | Solomon | 242/55.19 A |
| 3,863,853 | 2/1975 | Umeda | 242/55.19 A |
| 4,015,790 | 4/1977 | Gelardi et al. | 242/55.19 A |
| 4,695,003 | 9/1987 | Moris | 242/55.19 A |

FOREIGN PATENT DOCUMENTS

| | | |
|---|---|---|
| 84/04846 | 12/1984 | PCT Int'l Appl. . |
| 1095390 | 12/1967 | United Kingdom . |
| 1137926 | 12/1968 | United Kingdom . |
| 1154747 | 6/1969 | United Kingdom . |
| 1195563 | 6/1970 | United Kingdom . |
| 1208761 | 10/1970 | United Kingdom . |
| 1366811 | 9/1974 | United Kingdom . |
| 1469782 | 4/1977 | United Kingdom . |

Primary Examiner—David Werner
Attorney, Agent, or Firm—Birch, Stewart, Kolasch & Birch

[57] ABSTRACT

A microcassette tape comprising a tape housing including top and bottom case halves, a reel, a tape mounted on said reel, a rotating shaft for the tape reel, a pinch roller provided at the front of the tape housing, and a capstan between which the tape passes during endless revolutions of the tape. A guide is provided for preventing the tape from being misdirected and caught around the pinch roller and a wall is provided as a part of the tape housing for preventing the tape from slackening as it passes between the pinch roller and the capstan on a tangential path to the guide member which prevents the tape from being caught by the pinch roller. A further guide element is provided which prevents the tape from falling off the tape reel. A hole is provided in one of the halves of the tape housing which permits insertion of a shaft member for taking up any tape slack which develops in the passage of the tape from the tape reel to the pinch roller.

15 Claims, 3 Drawing Sheets

ENDLESS MICROCASSETTE TAPE

BACKGROUND OF THE INVENTION

1. Field of the Invention

The present invention relates generally to a continuous microcassette tape and more specifically to a microcassette or case for use in such a manner that the tape housed therein is useable for hours to reproduce responsive messages carried in general industrial equipment, such as telephone message recorders and toys having a mechanism for voice recording and reproduction.

2. Discussion of Related Art

The prior art to which the present invention is directed includes the art of endless cassette tapes described in U.S. Pat. Nos. 3,764,084 and 4,367,850. Such an endless cassette tape is capable of continuous travel because the tape is pulled off the innermost convolution and is returned to the outermost convolution, as a reel turns.

In case the quantity of the tape let out is greater than that of the tape being wound up, the tape will slacken. The slackened tape may be caught under a pinch roller and caused to fall off the reel. When the tape has slackened, moreover, the cassette must be disassembled and the reel must be turned manually in order to nullify the slackening. As a result, it is necessary to prevent such a tape from slackening.

The microcassette tape tends to be caught under a pinch roller particularly because the radius of the roller is small and this has resulted in an urgent need to meet the demand for endless microcasette tapes capable of stable travel.

On the other hand, a tape recorder containing a microcassette tape is normally compact and often carried as a portable recorder though it may sometimes be placed in a fixed position. In the case of the former, the endless tape is subjected to vibration and rocking and caused to slacken when the recorder is moved. Furthermore, the tape could slacken while being transported for delivery.

SUMMARY OF THE INVENTION

Therefore, an object of the present invention is to provide a microcassette tape which will overcome the above noted disadvantages.

A further object of the present invention is to provide a microcassette wherein the tape therein is free from slackening and retardation.

Still, a further object of the present invention is to provide a microcassette tape wherein the tape is capable of stable travel for hours.

To accomplish the purpose of the present invention, a guide plate is provided near a pinch roller to prevent the tape from being caught under the pinch roller and an off-reel preventive pin is installed on the outer peripheral edge of the reel to prevent the tape from falling off the reel. Moreover, in order to prevent the tape from slackening, there are provided a slackening preventive wall at the outer peripheral edge of the pinch roller and a guide hole for a recoil spindle for winding up the tape when the tape has slackened, the guide hole being bored just above the outer peripheral edge of the pinch roller in the tape housing.

DETAILED DISCUSSION

Referring now to the accompanying drawings, the construction of an endless or continuous microcassette tape embodying the present invention will be described.

Figure 1:
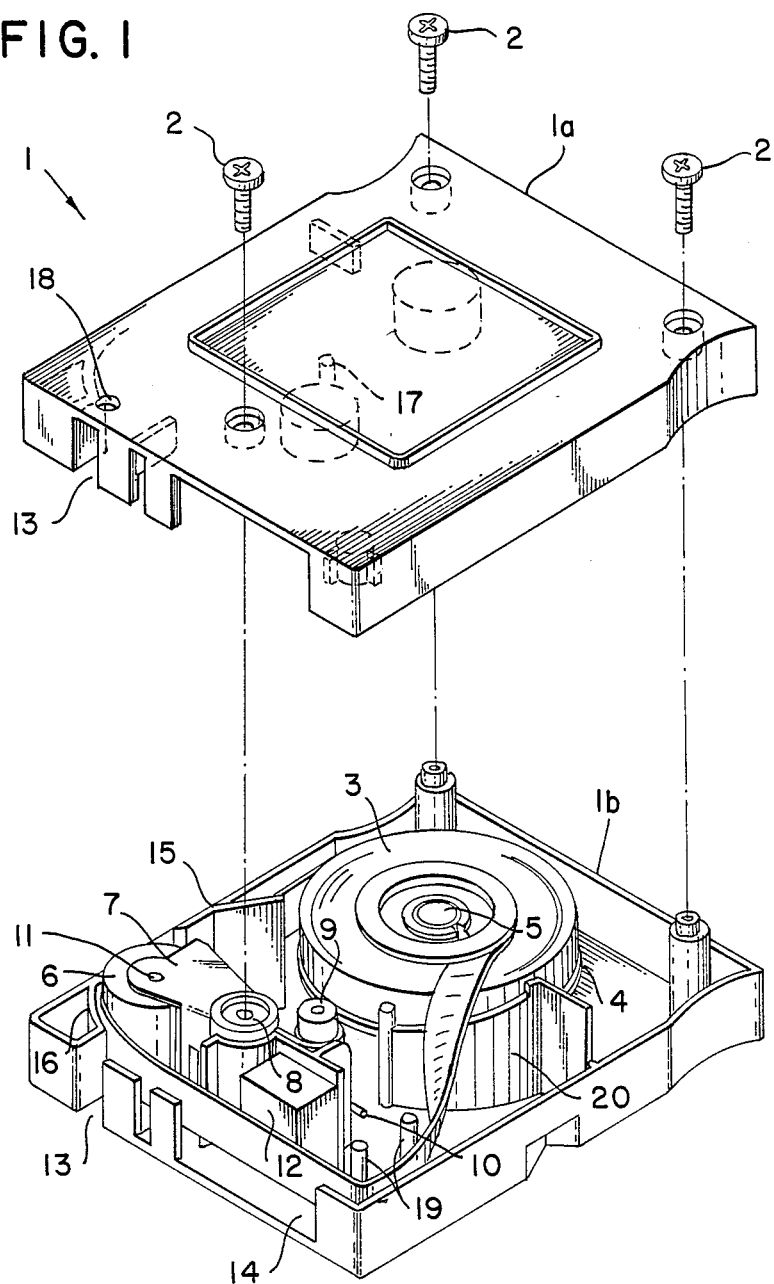
FIG. 1 is an exploded view of an endless microcassette embodying the present invention.
Figure 2:
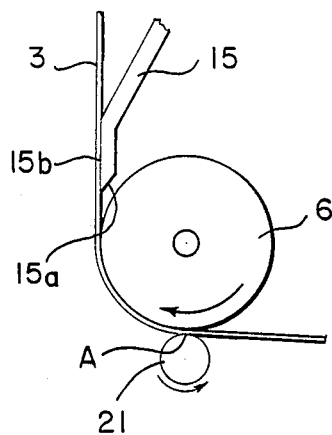
FIG. 2 is a detailed view of the periphery of a guide for preventing the tape from being caught under the pinch roller.
Figure 5:
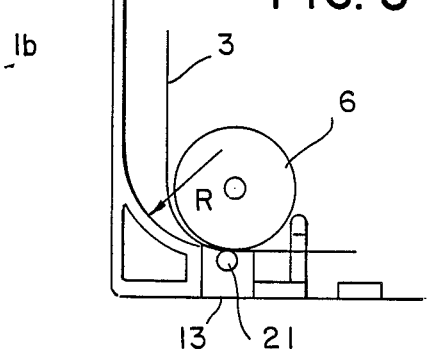
FIG. 5 is a diagrammatic illustration of an embodiment of the present invention intended to prevent a tape from slackening.
Figure 6:
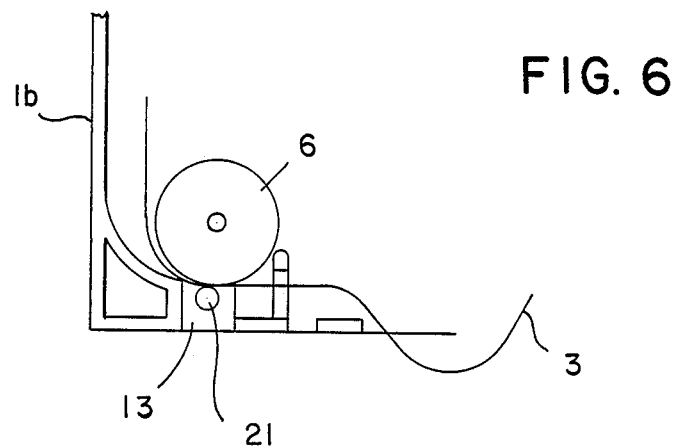
FIG. 6 is a diagrammatic illustration of an endless tape slipping out of an opening of a tape case.

In FIG. 1 there is seen the endless microcassette tape according to the present invention which comprises a tape housing 1, including a top case 1a, bottom case 1b, machine screws 2, tape 3, reel 4, reel rotating shaft 5, pinch roller 6, a pinch roller rotating shaft 11, a tape pad 12, an opening 13, an area 14 facing a head, a guide 15 for preventing the tape from being caught, a wall 16 for preventing the tape from slackening, an off-reel preventive tape pin 17, a hole 18 for guiding a shaft for rolling up any slackened tape, guide poles 19, tape support plate 20, and capstan 21 (FIGS. 2, 5, 6).

Guide for preventing the tape from being caught (15)

The guide 15 is provided to prevent the tape from adhering to and being caught under the pinch roller 6 when the tape is left unmoved for hours between the capstan 21 and the pinch roller 6.

If the tape is left unmoved for hours in such a state such that it is ready for use in reproducing a recorded voice therefrom, it may adhere to the pinch roller at a point A on its outer periphery, opposite to the capstan 21, as shown in FIG. 2. Normally, the diameter of the capstan 21 is about 2 mm and the diameter of the pinch roller is about 7 mm. The pinch roller is made for example of a synthetic rubber prepared from, e.g., neoprene. In the case when the tape adheres to the pinch roller, the tape sticking at the point A moves on the circumference of the pinch roller and winds therearound. The tape coils around the outer periphery of the pinch roller several times and ultimately the endless tape is damaged. In the present invention, the guide 15 (FIG. 2) is provided for preventing the tape from being caught under the pinch roller by forcing the tape to separate from the outer peripheral surface of the pinch roller, the guide 15 having a separating end face 15a and a flat end face 15b for use in preventing the tape from being caught under the pinch roller 6. The separating end face 15a forms an acute angle with the flat end face 15b and is spaced about 0.3 mm apart from the outer peripheral surface of the pinch roller 6. The surface of the flat end face 15b is arranged so that it is positioned above the tangent with the pinch roller 6. The guide 15 is thus installed to make the tape sticking to the pinch roller 6 peel off and consequently the tape is allowed to travel smoothly without being caught under the pinch roller 6.

Off-reel preventive tape guide (17)

Figure 3:
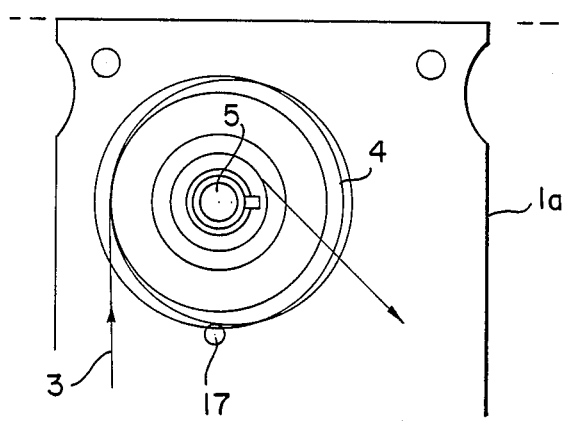
FIG. 3 is a detailed view of the periphery of a guide for preventing the tape from falling off the reel.

The outermost peripheral portion of the cassette tape wound on the reel may slacken because of vibration and the like during the transportation thereof or while it is being driven and, as a result, protrude from the outer periphery of the reel. Provided the quantity of the endless tape thus let out is equal to that of the tape being wound up, the one edge of the tape must be pulled out to take up the slackened tape by rotating the reel, but this will result in an abnormal operation because the tape which has slackened or fallen off the reel will be damaged. Moreover, the size of the microcassette allows no room for a further increase in the size of the reel so as to prevent the tape from falling off the reel. As shown in FIG. 3, at least one off-reel preventive guide is provided, e.g. in the form of pin 17, in a portion of the top case 1a of the tape housing 1 according to the present invention, the guide being positioned slightly closer to the reel rotating shaft 5 than the outermost peripheral edge of the reel, so that the tape is prevented from falling off the reel. The lowermost portion of the off-real preventive guide or, in this case, tape pin 17, is so arranged that its length is equivalent to about two-thirds of the width of the tape 3. The diameter of the pin should preferably be set at about 2 mm, provided the reel is about 21 mm in diameter. The off-reel preventive tape pin ensures that the tape is prevented from falling off the reel. Without the pin, the tape soon begins to slacken in the radial direction from the reel rotating shaft. As a result, the tape falls off the reel 4 as the tape is wound on the outer periphery of the real. As a result, the tape jams up and stops traveling.

Wall for preventing the tape from slackening (16)

Figure 4:
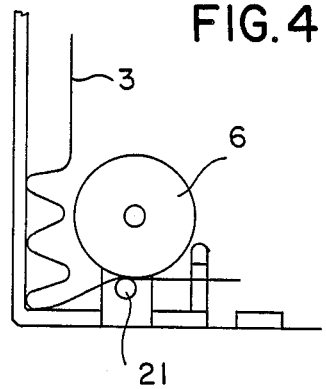
FIG. 4 is a diagrammatic illustration of a conventional case where a tape slackens so that the travel thereof is obstructed.

FIG. 4 is a partial view of the periphery of a pinch roller for a conventional microcassette tape. When the cassette tape is moved while it is in a slackened state, it may grow into what looks like a folded fan, as shown in FIG. 5, and will not roll up on the reel because the space between the pinch roller and the wall is extremely narrow, such as from about 1-2 mm.

FIG. 5 is a partial view of the periphery of the pinch roller according to the present invention, wherein the wall 16 for preventing the tape from slackening is installed to prevent the tape from being caught under the pinch roller and to keep it smoothly traveling, the aforesaid wall having a curved surface about the outer periphery of the pinch roller. Given that the radius of curvature of the curved surface of the aforesaid wall 16 is R, then R is greater than the radius of the pinch roller and the center thereof stands back from the central axis of the pinch roller in an opposite direction away from the capstan 21.

Hole for guiding a shaft for rolling up the slackened tape (18)

Figure 7:
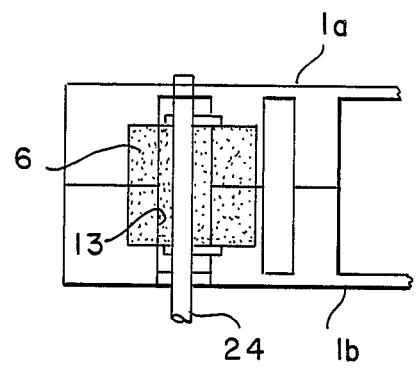
FIGS. 7 and 8 are diagrammatic illustrations of a mechanism for rolling up tape protrusions according to the present invention.
Figure 8:
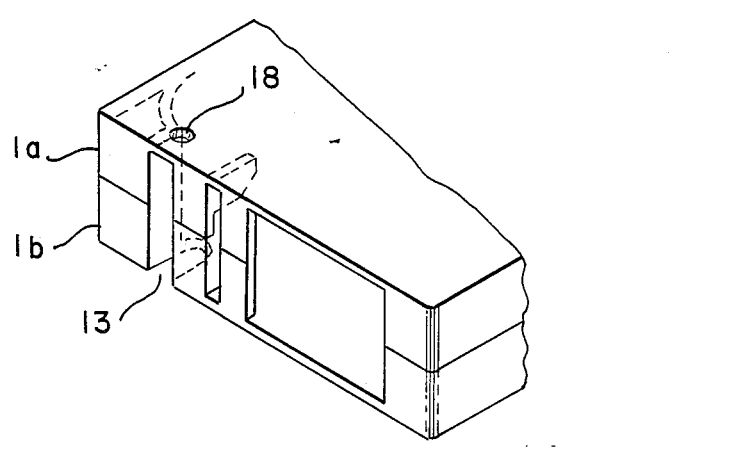

As shown in FIG. 6, slackened tape 3 may protrude from the case. Being that the configuration of the present invention is different from the conventional cassette tape, the protruding endless tape normally could not be rolled up. In order to roll up the tape, the machine screws 2 used to assemble the housing 1 would have to be unscrewed and then the slackened tape rolled up manually. However, such a solution is not practical and therefore a much more simple means is required for rolling up the tape. The aforesaid means of rolling up the tape according to the present invention comprises fitting a shaft 24 into the hole 18 prearranged in the case, as shown in FIG. 7, holding the tape between the pinch roller and the shaft and turning the shaft in the roll-up direction. The hole for guiding the shaft for rolling up the tape is characterized in that the outermost periphery of the hole is arranged to be in contact with the outermost periphery of the pinch roller. The shaft to be actually inserted into the hole may be articles of daily use, such as a round matchstick or a toothpick and the like and no special tool is required.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An endless microcassette tape wherein a recording tape is capable of stable travel therein comprising:
   a microcassette tape housing including a top case and a bottom case,
   a tape reel rotatably disposed within said housing, and
   recording tape wound on said reel, said tape housing further including,
   a reel rotating shaft rotatably supported on at least one of said top and bottom cases for supporting said reel in the rear of said housing,
   a pinch roller and a capstan rotatably provided on at least one of said top and bottom cases and positioned at the front of said microcassette tape housing for passage of said tape therebetween,
   first tape guide means secured to at least one of said top and bottom cases and positioned between said pinch roller and said reel rotating shaft so that said tape passes between said first tape guide means and an outer wall of said housing, wherein said first tape guide means has a surface portion for preventing said tape from being caught and collected under said pinch roller, said surface portion being on a line tangential to said pinch roller, and
   second tape guide means in the form of a curved preventive guide wall for directing said tape which passes said pinch roller to said first tape guide means and for preventing slackening of said tape within said microcassette tape housing following passage of said tape between said pinch roller and said capstan.

2. The microcassette tape of claim 1, further comprising third tape guide means in the form of a pin projecting from said top case of said housing adjacent to an peripheral edge of said tape reel for preventing said tape from falling off said reel.

3. The microcassette tape of claim 2, further including a hole means in at least one of said top case and bottom case for receiving insertion of a shaft-therethrough to take up slackened tape which might develop prior to passage of said tape between said pinch roller and said capstan.

4. The microcassette tape of claim 2, wherein said third tape guide means for preventing said tape from falling off said reel comprises a pin projecting from said top case of said tape housing, said tape guide pin being positioned slightly closer to said reel rotating shaft than an outermost peripheral edge of said reel.

5. The microcassette tape of claim 2, wherein said third tape guide means stands parallel to the rotational axis of said tape reel.

6. The microcassette tape of claim 5, wherein said third tape guide means is positioned slightly closer to said reel rotating shaft than an outermost peripheral edge of said tape reel.

7. The microcassette tape of claim 6, wherein the length of said third tape guide means is equivalent to about two-thirds of the width of said tape.

8. The microcassette tape of claim 1, further including a hole means in at least one of said top case and bottom case for receiving insertion of a shaft therethrough to take up slackened tape which might develop prior to passage of said tape between said pinch roller and said capstan.

9. The microcassette tape of claim 8, wherein said hole means is provided on the top case of said housing in an opening wherein said capstan is juxtapositioned to said pinch roller.

10. The microcassette tape of claim 8, wherein an outermost periphery of said hole is arranged to be in contact with an outermost periphery of said pinch roller.

11. The microcassette tape according to claim 1, wherein said first tape guide means for preventing said tape from being caught and collected under said pinch roller comprises a tape guide wall having a first section which includes said surface portion adjacent to said pinch roller and parallel to said outer wall of said housing, and a second section adjacent to said tape reel which angles away from said outer wall, and wherein said second tape guide means for directing said tape tangential to said pinch roller comprises a curved preventive guide wall positioned between said pinch roller and an outer wall of said housing.

12. The microcassette tape of claim 11, wherein said first tape guide means includes a separating end portion at the end of said first section which forms an acute angle with said surface portion and is juxtapositioned to an outer peripheral surface of said pinch roller, said surface portion being a flat face positioned above the tangent of said pinch roller.

13. The microcassette tape of claim 11, wherein said curved preventive guide wall for preventing tape slackening has a radius of curvature greater than the radius of said pinch roller, wherein the center of said radius of curvature is positioned between the central axis of said pinch roller and said reel, opposite the location of said capstan with respect to said central axis of said pinch roller.

14. The microcassette tape of claim 1, wherein said first tape guide means further includes a separating end portion for separating said tape from said pinch roller, said end portion forming an acute angle with said surface portion.

15. The microcassette tape of claim 1, wherein said second tape guide means has a curved surface with a radius of curvature greater than the radius of said pinch roller, wherein the center of said radius of curvature is positioned between the central axis of said pinch roller and said tape reel, opposite the location of said capstan with respect to said central axis of said pinch roller.

* * * * *

UNITED STATES PATENT AND TRADEMARK OFFICE
CERTIFICATE OF CORRECTION

PATENT NO. : 4,817,881

DATED : April 4, 1989

INVENTOR(S) : Hiromi Nakai and Masao Tsurumaki

It is certified that error appears in the above-identified patent and that said Letters Patent is hereby corrected as shown below:

In the drawings, Sheet 1, Fig. 1, the reference numerals 7, 8, 9 and 10, as well as the elements identified by reference numerals 7, 9 and 10 are deleted so that Fig. 1 appears as shown on the attached page.

Signed and Sealed this

Eighth Day of January, 199

*Attest:*

HARRY F. MANBECK, JR.

*Attesting Officer*         *Commissioner of Patents and Trademarks*

UNITED STATES PATENT AND TRADEMARK OFFICE
CERTIFICATE OF CORRECTION

PATENT NO. : 4,817,881

DATED : April 4, 1989

INVENTOR(S) : Hiromi Nakai and Masao Tsurumaki

It is certified that error appears in the above-identified patent and that said Letters Patent is hereby corrected as shown below:

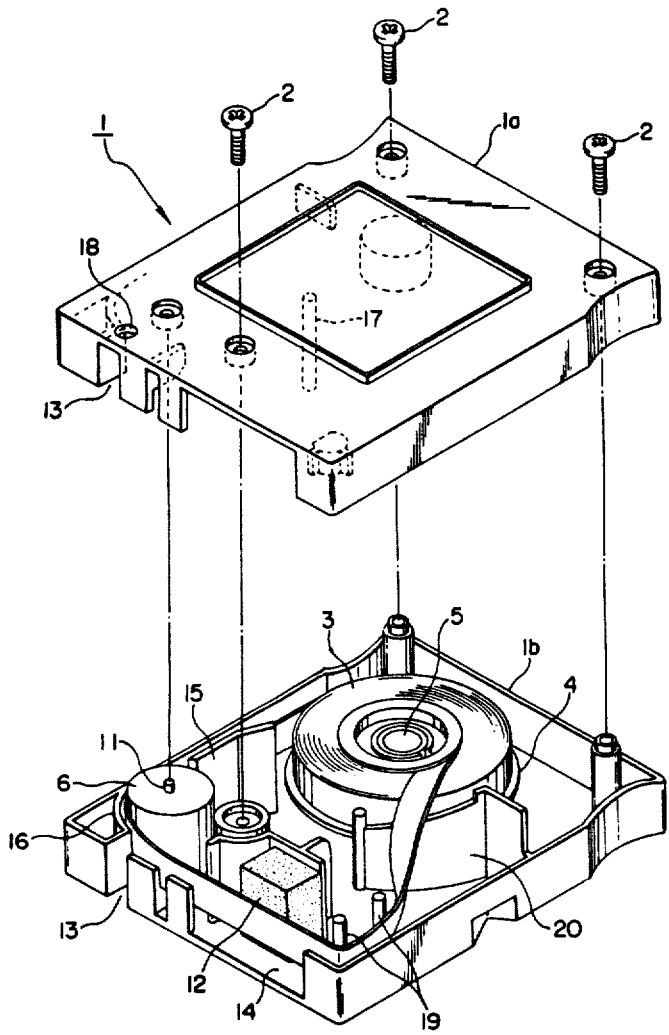

FIG. 1